April 14, 1959 D. N. MacDONALD 2,882,078

REEL SUPPORTING SPINDLE

Filed Aug. 25, 1954

INVENTOR.
DUNCAN N. MAC DONALD

BY

Christie, Parker & Hale
ATTORNEYS

United States Patent Office 2,882,078

Patented Apr. 14, 1959

2,882,078

REEL SUPPORTING SPINDLE

Duncan N. MacDonald, Arcadia, Calif., assignor, by mesne assignments, to Burroughs Corporation, Detroit, Mich., a corporation of Michigan Application August 25, 1954, Serial No. 452,085

2 Claims. (Cl. 287—53)

This invention relates to an improved spindle for supporting an apertured member, and more particularly, to an improved reel supporting spindle to which a reel may be easily attached and from which a reel may be rapidly removed.

In tape handling systems, such as magnetic tape recording systems, the tape is generally wound on a reel which is attached to a drive spindle by means of threaded locking rings or knobs. In order to remove a reel from a conventional spindle, ordinarily it is necessary to disengage the reel locking mechanism and remove it from the spindle. This is time consuming and has the disadvantage that the locking mechanism may be detached and misplaced.

My invention provides an improved spindle which is adapted to hold a tape reel in a positive manner while at the same time allowing a quick disconnection of the reel for loading and unloading without the removal of the locking mechanism from the spindle. In one embodiment, a spindle hub which is adapted to receive a reel is provided with a plurality of latch arms which are pivotally mounted to the hub and which are adapted to engage a reel in a fixed position. In addition, there is provided an actuating member for causing the latch arms to be retracted whereby reels may be removed from the hub. In one particular embodiment, the latch arms are provided with an arcuate end portion, by means of which a reel may be pushed onto the hub with the latch arms being displaced until the reel is seated, at which time the latch arms engage the reel in a fixed position.

A better understanding of my invention may be had upon a reading of the following specification in connection with the drawings, in which.

Figures 1, 2, 3, 4:
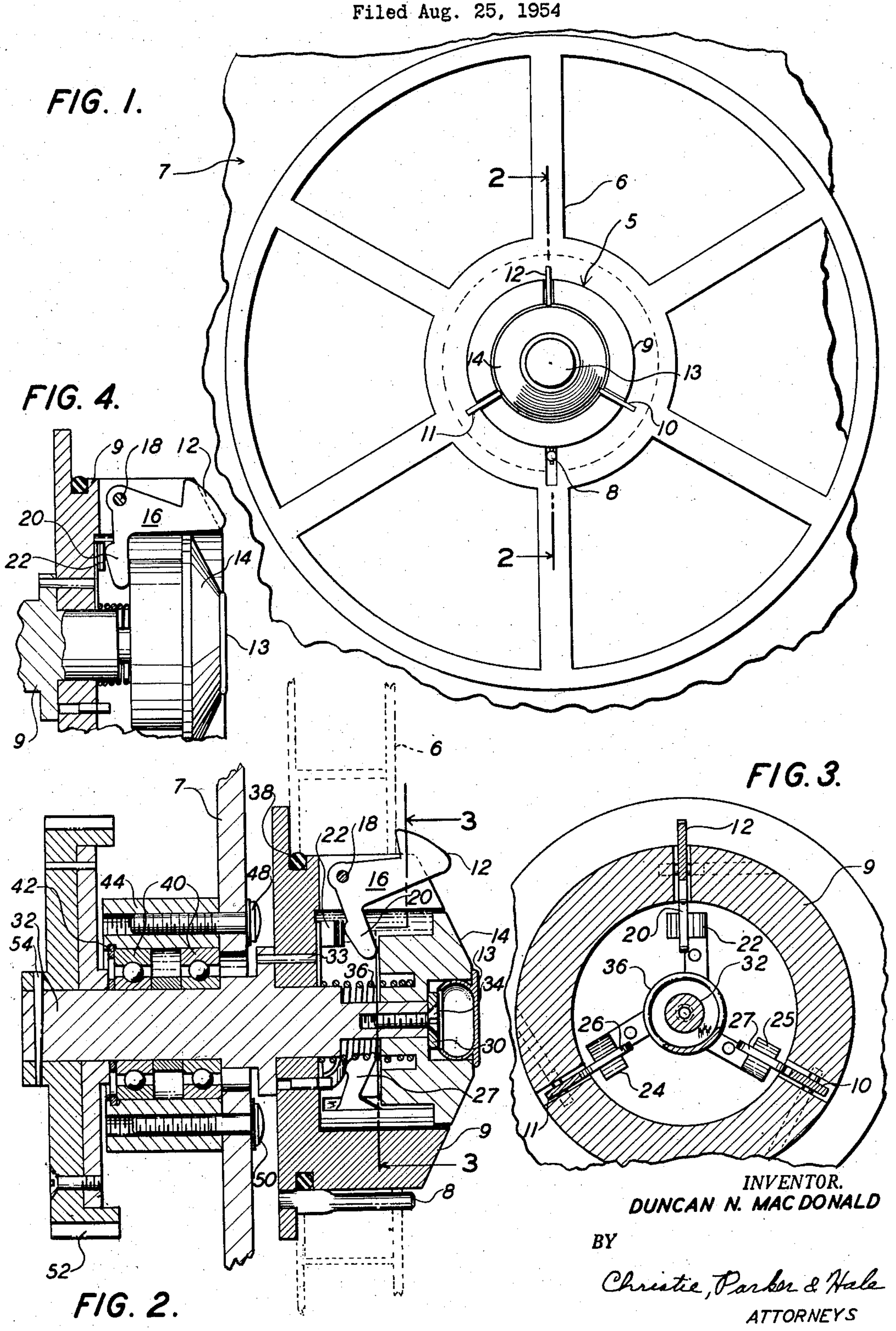
Fig. 1 is a plan view including a reel spindle and a reel mounted thereon.
Fig. 2 is a sectional view taken along line 2—2 of Fig. 1, showing the internal construction of one embodiment of my invention.
Fig. 3 is a sectional view taken along line 3—3 of Fig. 2.
Fig. 4 is a partial sectional view showing the manner in which the latch arms may be retracted.

Referring to the drawings in detail, the reference characters of which represent similar parts throughout the several views, Fig. 1 shows in plan view a locking reel spindle 5 upon which is mounted a reel 6. The locking reel spindle 5 is rotatably mounted to a frame 7 and the reel 6 is keyed to the locking reel spindle by a driving pin 8. It will be noted that the locking reel spindle 5 includes a cup-shaped hub 9 which has three radial slots in which are disposed the latch arms 10, 11 and 12. By pressing a button 13 which is attached to an actuating member 14, the latch arms 10, 11 and 12 may be moved inwardly toward the center of the locking reel spindle 5 so that the reel 6 may be slidably removed from the hub 9.

In Fig. 2 the latch arm 12 is shown in a position in which it engages the reel 6. The latch arm 12 is a part of an L-shaped lever 16 which is pivotally mounted to the hub 9 by a pin 18. Extending inwardly from the pin 18 the L-shaped lever includes an actuating arm 20. The latch arm 12 of the L-shaped lever 16 is maintained in reel engaging position by a leaf spring 22 bearing against the actuating arm 20. In like manner the L-shaped levers of the latch arms 10 and 11 are pivotally supported to the hub 9 and suitably maintained in reel engaging position by means of leaf springs 24 and 25 (Fig. 3) beneath the actuating arms 26 and 27. The hub 9 is fastened to the shaft 32 and is secured for rotation with the shaft 32 by a pin 33.

The actuating member 14, to which is attached the push button 13, is held in position against a seat formed by a washer 30 fastened to the spindle end of the shaft 32 by a flatheaded machine screw 34. A helical spring 36 urges the actuating member 14 outwardly from the hub 9 so that the actuating member is pressed against the washer 30. By pressing the push button 13, the actuating member 14 may be slidably moved along the shaft 32, thereby engaging the actuating arms 20, 26 and 27 and displacing the latch arms 10, 11 and 12 inwardly so that the reel 6 may be removed from the hub 9. The position of the L-shaped lever 16 and its latch arm 12, when displaced from reel engaging position, is shown in Fig. 4.

Another reel may be placed on the hub 9 by sliding the reel over the latch arms 10, 11 and 12, which are displaced inwardly by pressure of the reel against their arcuate end portions. When the reel is seated on the hub, the latch arms 10, 11 and 12 will snap outwardly, thereby engaging the reel and holding it in fixed position.

In order to prohibit play between the reel and the hub 9, an annular ring 38 of resilient material, such as neoprene or the like, may be disposed about the inner part of the hub 9.

Where the apparatus of my invention is to be employed to support a rotatable reel, the shaft 32 may be journalled to the frame 7. One exemplary construction includes a pair of ball bearing units 40. These may be held in position by a retaining ring 42 and a cylindrical collar 44 which is held to the frame 7 by the cap screws 48 and 50. In the illustrative embodiment, a driving gear 52 is attached to the shaft 32 by means of a tapered pin 54 so that the spindle may be rotatably driven by some suitable means (not shown).

Although the illustrative embodiment of the invention has been described for use in a tape reeling system, it will be appreciated that the principles embodied therein may be used for supporting any kind of apertured member without departing from the spirit of the invention.

I claim:

1. An apparatus for supporting a reel including a frame, a rotatable shaft journalled to the frame, a cup-shaped reel-receiving hub attached to the shaft, said hub having a slotted outer periphery, a plurality of L-shaped levers each of which is pivotally mounted to said hub in one of the slots and each of which includes a latch arm and an actuating arm, a plurality of first springs disposed within the recess of the cup-shaped hub between a surface of the recess and the L-shaped levers for individually maintaining the latch arms of the levers in a reel-engaging position, an actuating member, means for mounting the actuating member on the hub coaxially therewith, the actuating member being slidable along said means to engage simultaneously the actuating arm of each L-shaped lever and thereby retract each latch arm from the reel-engaging position, and a second spring disposed between the hub and the actuating member biasing the actuating member in a position disengaged from the L-shaped levers.

2. Apparatus in accordance with claim 1 wherein the latch arm of each L-shaped lever includes an arcuate end surface by means of which the latch arms are displaced by a reel when it is slidably placed upon said hub.

References Cited in the file of this patent

UNITED STATES PATENTS

| | | |
|---|---|---|
| 285,303 | Patten | Sept. 18, 1883 |
| 1,067,367 | Noster | July 15, 1913 |
| 1,946,455 | Davis | Feb. 6, 1934 |
| 2,251,470 | Stacey | Aug. 5, 1941 |
| 2,613,967 | Coffing | Oct. 14, 1952 |
| 2,652,989 | Ripley | Sept. 22, 1953 |

FOREIGN PATENTS

| | | |
|---|---|---|
| 76,505 | Sweden | May 1, 1931 |